United States Patent [19]

Masters et al.

[11] 4,188,570
[45] Feb. 12, 1980

[54] GIMBAL ANGLE RATE FEEDBACK BY CAGE COIL DEMODULATION

[75] Inventors: Blake W. Masters, King George; Robert D. Moran, Dahlgren, both of Va.

[73] Assignee: The United States of America as represented by the Secretary of the Navy, Washington, D.C.

[21] Appl. No.: 928,921

[22] Filed: Jul. 28, 1978

[51] Int. Cl.² .............................................. G05B 5/01
[52] U.S. Cl. ..................................... 318/616; 318/648; 318/649; 244/79; 244/165
[58] Field of Search ............... 318/584, 586, 616, 648, 318/649; 244/79, 165; 73/504; 74/5.1, 5.12, 5.14, 5.4, 5.6 D, 5.6 E

[56] References Cited

U.S. PATENT DOCUMENTS

| | | | |
|---|---|---|---|
| 3,848,172 | 11/1974 | Thomas | 318/648 |
| 3,984,748 | 10/1976 | Sullivan | 318/648 |
| 4,125,799 | 11/1978 | Harduvel | 318/649 |

Primary Examiner—J. V. Truhe
Assistant Examiner—Eugene S. Indyk

[57] ABSTRACT

A circuit for applying rate feedback to the pitch and yaw canard commands of a guided projectile or missile to stabilize the airframe. The circuit demodulates and differentiates the signal from the gyro cage coil to obtain a signal representative of the airframe movement at its natural frequency. Phase detectors provide a phase reference by comparing the cage signal carrier with the output of hall effect elements in the speed sensing circuitry. The rate amplitude from the differentiator is then multiplied by the phase references to resolve the rate into pitch and yaw command components. Summation circuits then scale and subtract the rate commands from the guidance commands to provide negative rate feedback.

12 Claims, 7 Drawing Figures

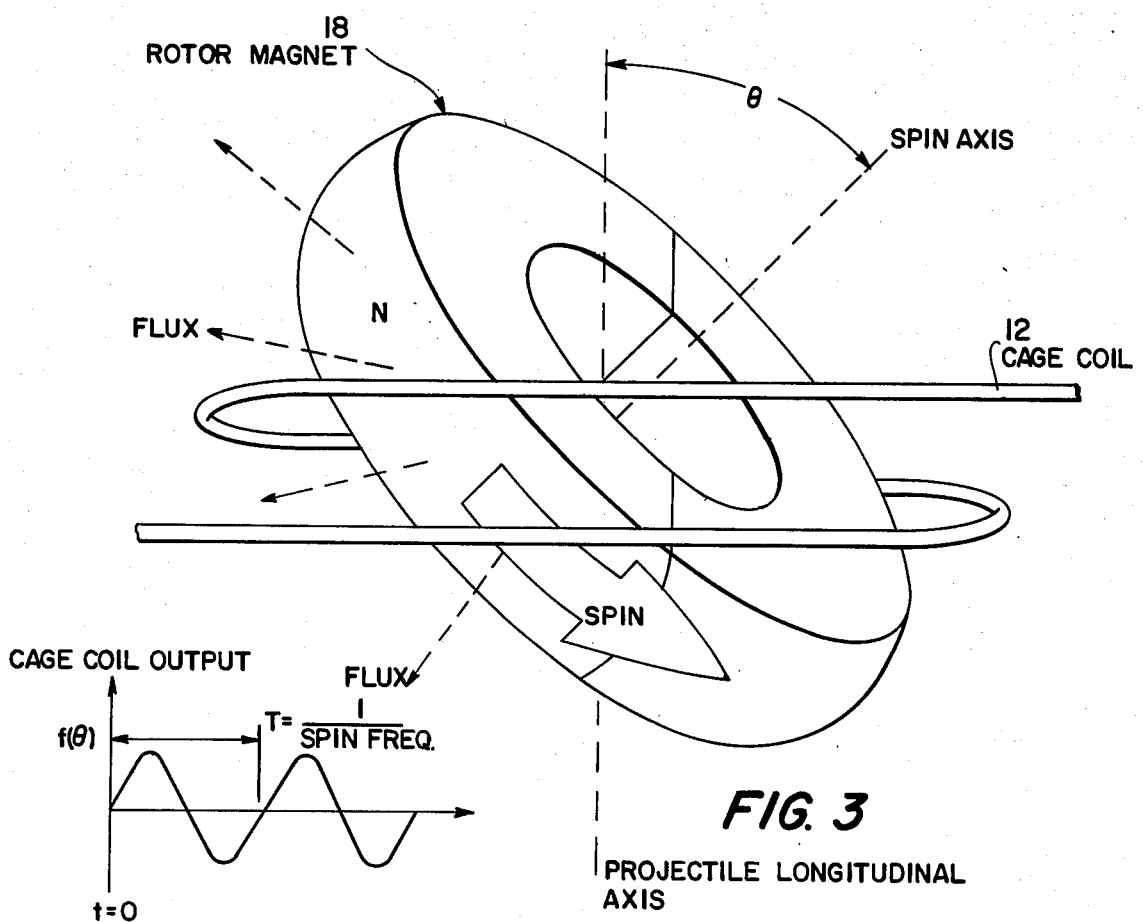
FIG. 3
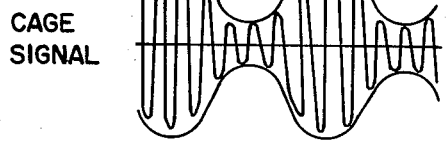
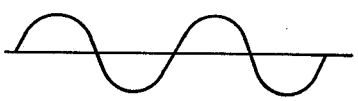
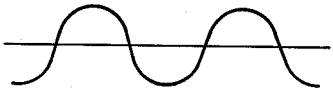
FIG. 6A
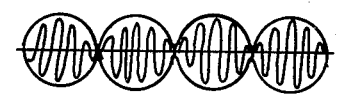
FIG. 6B

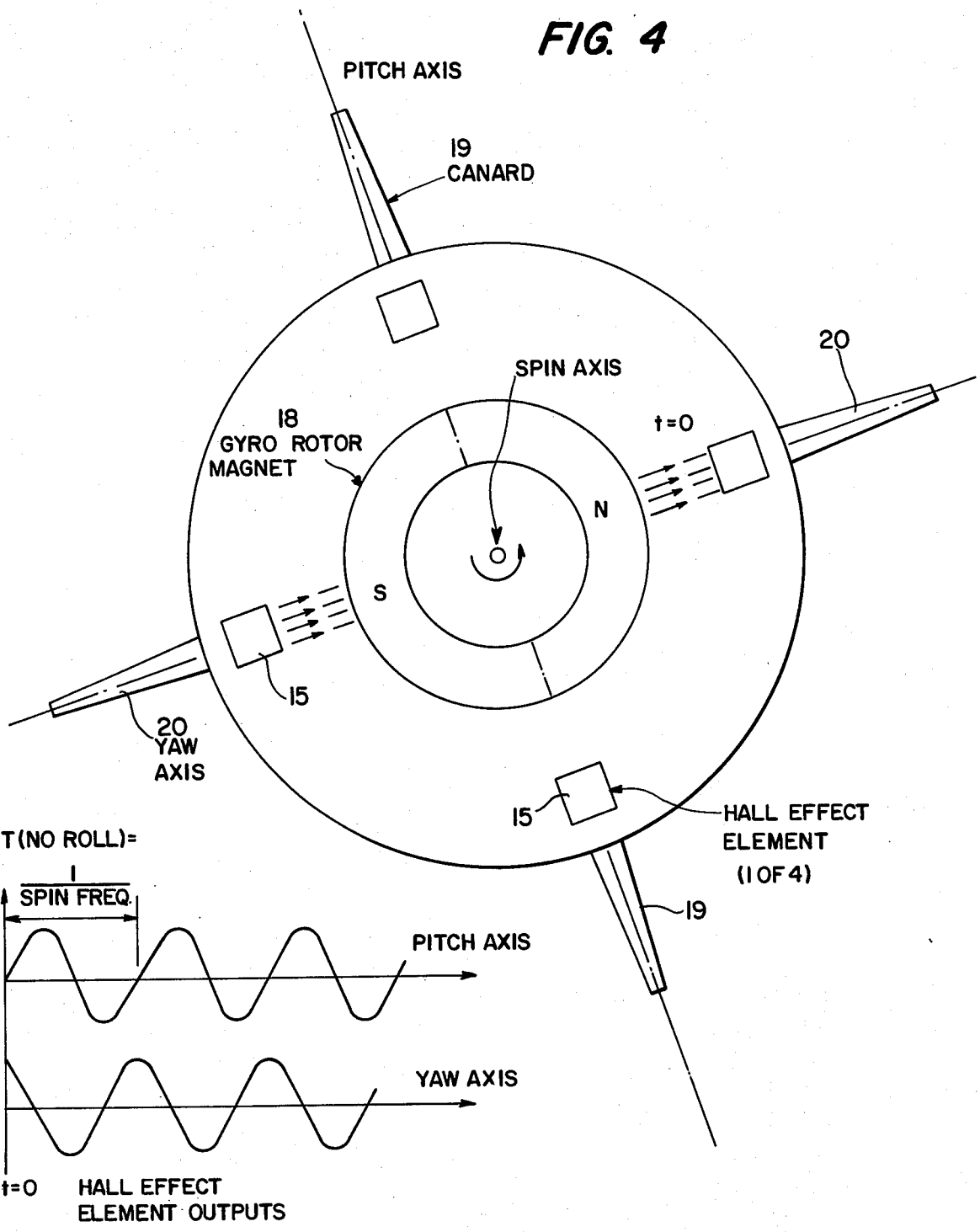

GIMBAL ANGLE RATE FEEDBACK BY CAGE COIL DEMODULATION

BACKGROUND OF THE INVENTION

In a standard guidance system for guided projectiles, the rotor of the guidance gyro is generally held off its bearings until after the projectile exits the gun tube. The rotor is then automatically moved onto its bearings and the spin control circuitry brings the rotor up to its design speed. The cage coil is then energized to align the spin axis of the rotor with the projectile longitudinal axis. At target acquisition when guidance begins, the precession coils move the gyro to look at the target and the cage coil is dropped out of the circuit. The guidance system generates pitch and yaw canard commands which are applied to the pitch and yaw servos to guide the projectile or missile toward the target. It is necessary to apply rate feedback to the canard commands in order to avoid endless hunting by the guidance system or oscillation at the natural frequency of the airframe.

Rate feedback is normally derived by an additional sensor apart from the guidance gyro. This sensor may be a rate gyro, a vibrating beam or "vyro", a gas jet flowing on a hot resistance bridge, or another type of rate sensor. These sensors add additional costs and complication to the electronics package. Another scheme uses the guidance gyro gimbal angle differentiated for rate feedback. Gimbal angle is sensed by potentiometers attached to the pitch and yaw gimbals. However, this potentiometer system introduces friction on the gimbals which is undesirable.

SUMMARY OF THE INVENTION

The present invention operates entirely from electronics associated with the guidance gyro itself and requires neither additional rate sensors nor gimbal potentiometers. The circuit is driven by signals derived from the cage coil, the pitch and yaw hall effect elements of the speed sensing circuitry and the pitch and yaw canard commands all of which are present in the standard guidance system. The cage coil signal is demodulated and differentiated to provide a signal representative of the rate of airframe movement at the airframe's natural frequency which is then multiplied by phase references derived from the pitch and yaw hall effect elements to resolve the rate signal into pitch and yaw command components. The resulting rate commands are then subtracted from the pitch and yaw canard guidance commands to provide negative feedback.

STATEMENT OF THE OBJECTS OF THE INVENTION

It is a primary object of the present invention to provide a new and improved rate feedback system for the guidance systems of projectiles and missiles.

It is another object of the present invention to provide a rate feedback system for guided projectiles and missiles which does not require the use of additional sensors.

It is a further object of the present invention to provide a simple circuit for producing rate feedback and operable entirely from the signals already present in a standard guidance system.

BRIEF DESCRIPTION OF THE DRAWINGS

Other objects, advantages and novel features of the invention will become readily apparent upon consideration of the following detailed description when read in conjunction with the accompanying drawings wherein:

FIG. 3 is a view similar to FIG. 2 except that the gyro is uncaged;

FIG. 4 is a schematic illustration of the hall effect elements aligned with the projectile pitch and yaw axes;

FIGS. 6a and 6b illustrate some of the waveforms present in the circuitry of FIG. 5 when the modulation is less than and greater than 100%.

DESCRIPTION OF THE PREFERRED EMBODIMENT

Figure 1:
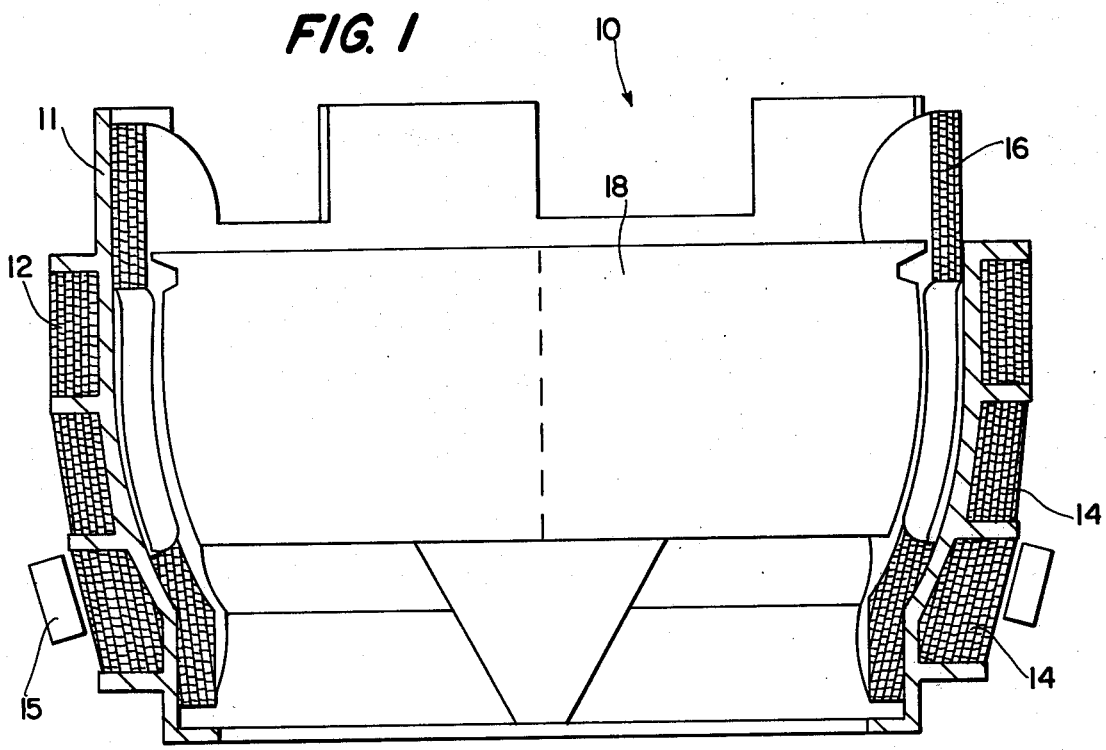
FIG. 1 is a sectional view through a guidance gyro showing the location of the cage coil and hall effect elements.

Attention now is directed to the drawings, wherein like numerals of reference designate like parts throughout the several views, and more particularly to FIG. 1 wherein there is shown a sectional view through a guidance gyro designated generally by the reference numeral 10. The gyro 10 comprises a frame 11 having a cage coil 12 mounted thereon. The cage coil is attached to the gyro frame 11 normal to the axis of the gyro 10 and to the longitudinal axis of the airframe (not shown) and is used to drive the rotor to a look ahead position before guidance begins. A pair of precession coils 14 are mounted on the frame 11 and are used to drive the gyro to precess it to cage (before guidance) or track a target (during guidance). A set of four hall effect elements 15, only two of which are shown in FIG. 1, are positioned adjacent gyro 10 to sense the passing of the magnetic rotor and are used in conjunction with appropriate circuitry (not shown) to regulate spin speed of the rotor. A motor coil 16 is mounted within the gyro 10 and is used to drive a gyro rotor 18 which is a magnetized rotating mass which constitutes the inertial element in the guidance system.

Figure 2:
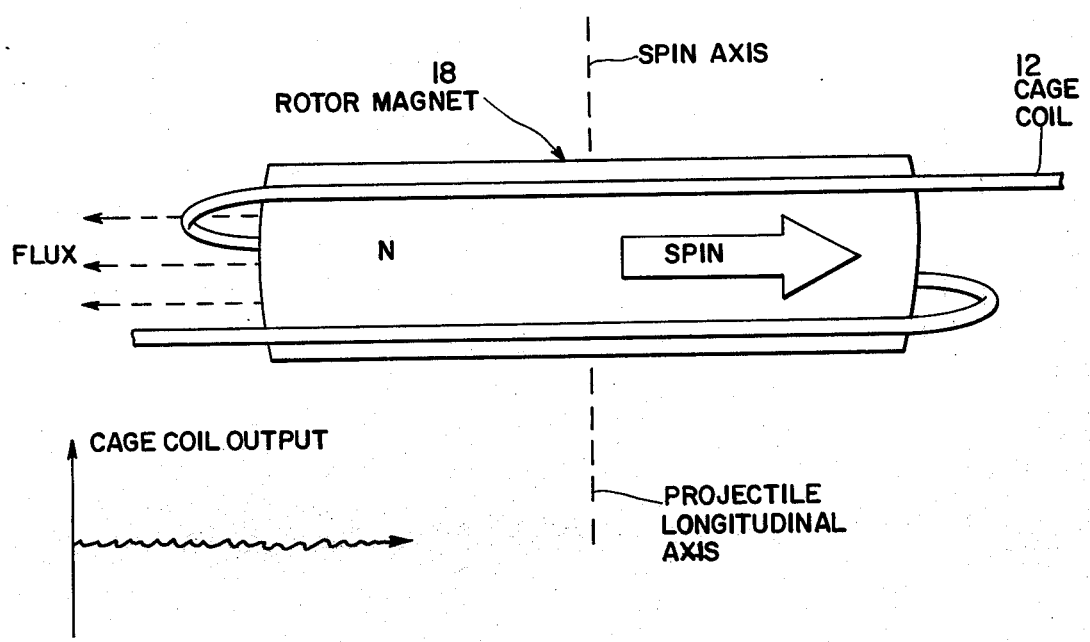
FIG. 2 is a schematic representation of a gyro rotor and cage coil with the gyro caged.

After the rotor 18 is spun up to its operating speed, the cage coil 12 is energized to cage the gyro, i.e., to align the spin axis of the rotor with the projectile longitudinal axis as shown schematically in FIG. 2. After the target is acquired and guidance begins, the precession coils 14 are energized to move the gyro to look at the target. The cage coil is no longer used by the standard guidance system and is in fact dropped out of the circuit. However, since the cage coil 12 is still cutting lines of magnetic flux emanating from the magnetic rotor 18, a signal is still available at the cage coil terminals. This signal is illustrated in FIG. 3 and is a sine function of the angle $\theta$ between the projectile longitudinal axis and the inertial gyro rotor axis. Thus, during guidance, the cage coil contains information on the magnitude of the airframe motion with respect to an inertial reference axis. The information is in the form of a signal with a carrier at the gyro spin frequency and a modulation at the airframe natural frequency. It should be noted that the amplitude of the cage coil signal is independent of airframe roll because of the symmetry of the coil.

Many guidance systems have spin sensors such as the hall effect elements 15 shown aligned with the projectile pitch and yaw axes in FIG. 4 wherein is also illustrated pitch canards 19 and yaw canards 20. These hall effect elements have a maximum output when a pole of the rotor 18 is aligned with the hall effect element and are used with appropriate circuitry (not shown) to sense and control rotor spin frequency. The hall effect elements are always 90° out of phase with each other and they are not independent of airframe roll. For roll in the direction of gyro spin the hall output frequency is lowered by the roll frequency and for roll counter to the gyro spin, the hall frequency is increased by the roll frequency. This effect introduces only a negligible error in sensing spin speed, but is a great asset for a phase reference in the rate feedback circuit which will next be described.

Figure 5:
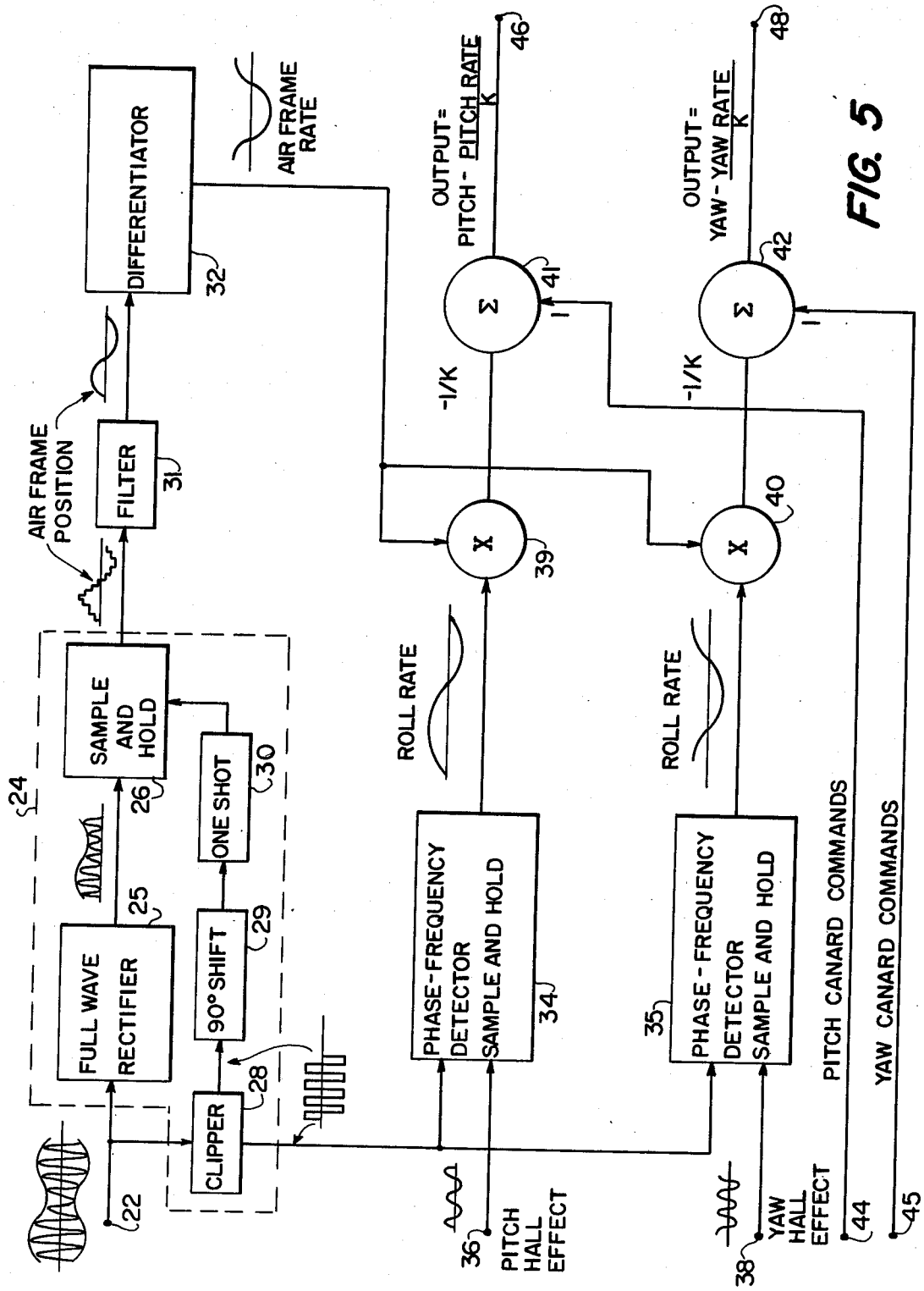
FIG. 5 is a block diagram of the circuitry of the present invention.

FIG. 5 shows a block diagram of the gimbal angle rate feedback circuit. The cage coil signal is applied through terminal 22 to a synchronous demodulator 24. The synchronous demodulator 24 comprises a full wave rectifier 25 and a sample and hold circuit 26 driven from the carrier through a clipper 28, a 90° shifter 29, and a one shot 30. The output of the synchronous demodulator 24 is applied to a filter 31 and becomes a sinusoidal signal which is a good representation of the airframe natural frequency with respect to an inertial reference, i.e., the guidance gyro 10. A differentiator 32 converts the airframe position signal from the filter 31 into an airframe rate signal.

The phase reference for the circuit is obtained from phase-frequency detectors 34 and 35. These are actually sample and holds which sample the pitch and yaw hall effect outputs, applied to the terminals 36 and 38, respectively, with the cage signal carrier from the clipper 28 as a sample reference. If the cage and one of the hall effect elements are in phase, the associated phase detector output will be a logical "one". If the cage and one hall effect element are 90° out of phase, the output of the associated phase detector will be a logical "zero". If $\phi$ is the phase difference between the cage and one hall effect element, the output of the associated phase detector will be $\cos \phi$. If the airframe is rolling, the hall effect will be increased or decreased by the roll rate and the output of phase detectors 34 and 25 will be sinusoids at the roll frequency and in phase with the pitch or yaw axis.

Multiplier circuits 39 and 40 multiply the rate amplitude from the differentiator 32 by the phase references of the phase detectors 34 and 35. Thus the rate is resolved into pitch and yaw command components which are correct whether the projectile is rolling or not. Summation circuits 41 and 42 scale and subtract the rate commands, received from the multipliers 39 and 40, from the guidance commands, received through terminals 44 and 45, which results in negative rate feedback. The modified commands are then applied through terminals 46 and 48 to the servos (not shown) which control the canards 19 and 20 (FIG. 4), respectively. FIG. 6a and 6b illustrate the two cases of cage coil modulation. In Case I, the airframe angular motion is less in magnitude than the gimbal angle and the modulation is less than 100%. In Case II the airframe angular motion is greater than the gimbal angle and the modulation exceeds 100%. It can be seen that both cases give substantially the same resultant output, the only difference being the spike in the waveform when the phase detector switches.

From the foregoing, it will be apparent that the present invention provided numerous advantages not found in prior art devices. For example, this rate feedback is completely derived from signals used in conjunction with the primary guidance gyro. There are no additional rate sensors or gimbal potentiometers required. Also, it is readily apparent that the aforedescribed invention is simple and inexpensive.

Obviously many modifications and variations of the present invention are possible in the light of the above teachings. For example, the hall effect elements could be replaced with pickup coils. Also, the hall effect could be used to sample the cage signal instead of vice versa. It is therefore to be understood that within the scope of the appended claims the invention may be practiced otherwise than as specifically described.

What is claimed is:

1. In an automatic guidance system for projectiles or missiles including a guidance gyro having a rotating magnetic mass, a cage coil, pitch and yaw hall effect elements and precession coils, and means for providing guidance commands to pitch and yaw canards, the improvement comprising:

a synchronous demodulator for receiving the cage coil output and for providing a sinusoidal output signal representative of the airframe position relative to the gyro axis, said cage coil output during guidance being a signal with a carrier at the gyro spin frequency and a modulation at the airframe natural frequency;

a differentiator for converting the output of said synchronous demodulator into a signal representative of the rate of airframe movement;

a pair of phase—frequency detectors for sampling the pitch and yaw hall effect element outputs with the cage signal carrier as a sample to provide phase references for the circuit;

a pair of multipliers for multiplying the rate amplitude from said differentiator by the phase references from said phase detectors to resolve the rate into pitch and yaw command components; and a pair of summation circuits for scaling and subtracting the rate commands provided by said multipliers from the guidance commands to the pitch and yaw canards whereby negative rate feedback is obtained.

2. The system of claim 1 wherein said synchronous demodulator comprises:
a full wave rectifier; and
a sample and hold circuit driven from the cage coil carrier by:
a clipper,
a 90° shifter, and
a one shot.

3. The system of claim 2 wherein said clipper provides the cage signal carrier for said phase—frequency detectors.

4. The system of claim 1 wherein a filter is provided between said synchronous demodulator and said differentiator for smoothing out the signal before differentiation.

5. The system of claim 4 wherein said synchronous demodulator comprises:
a full wave rectifier; and
a sample and hold circuit driven from the cage coil carrier by:
a clipper,
a 90° shifter, and
a one shot.

6. The system of claim 5 wherein said clipper provides the cage signal carrier for said phase—frequency detectors.

7. A negative rate feedback circuit for the gyro based automatic guidance systems of guided projectiles and missiles comprising:
- a synchronous demodulator for receiving the gyro cage coil output during guidance and for providing a sinusoidal output signal representative of the airframe position relative to the gyro axis, said cage coil output during guidance being a signal with a carrier at the gyro spin frequency and a modulation at the airframe natural frequency;
- a differentiator for converting the output of said synchronous demodulator into a signal representative of the rate of airframe movement;
- a pair of phase—frequency detectors for sampling the outputs of the spin sensing elements of the gyro speed control circuit with the cage carrier signal as a reference to provide phase references for the circuit;
- means for multiplying the rate amplitude from said differentiator by the phase references from said phase detectors to resolve the rate into pitch and yaw command components; and
- a pair of summation circuits for scaling and subtracting the rate commands provided by said multiplying means from the guidance commands to the pitch and yaw canards whereby negative rate feedback is obtained.

8. The circuit of claim 7 wherein said synchronous demodulator comprises:
- a full wave rectifier; and
- a sample and hold circuit driven from the cage coil carrier by:
  - a clipper,
  - a 90° shifter, and
  - a one shot.

9. The system of claim 8 wherein said clipper provides the cage signal carrier for said phase—frequency detectors.

10. The system of claim 7 wherein a filter is provided between said synchronous demodulator and said differentiator for smoothing out the signal before differentiation.

11. The system of claim 10 wherein said synchronous demodulator comprises:
- a full wave rectifier; and
- a sample and hold circuit driven from the cage coil carrier by:
  - a clipper,
  - a 90° shifter, and
  - a one shot.

12. The system of claim 11 wherein said clipper provides the cage signal carrier for said phase—frequency detectors.

* * * * *